United States Patent
Dunk

(10) Patent No.: US 8,244,904 B2
(45) Date of Patent: *Aug. 14, 2012

(54) ELECTRONIC DEVICE AND BASE STATION FOR MAINTAINING A NETWORK CONNECTION

(75) Inventor: Craig Allan Dunk, Guelph (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/282,983

(22) Filed: Oct. 27, 2011

(65) Prior Publication Data

US 2012/0047272 A1 Feb. 23, 2012

Related U.S. Application Data

(60) Continuation of application No. 12/748,872, filed on Mar. 29, 2010, now Pat. No. 8,073,964, which is a continuation of application No. 12/188,570, filed on Aug. 8, 2008, now Pat. No. 7,720,989, which is a division of application No. 10/784,984, filed on Feb. 25, 2004, now Pat. No. 7,426,569.

(51) Int. Cl.
*G06F 15/16* (2006.01)

(52) U.S. Cl. ......... 709/232; 709/224; 709/228; 709/250

(58) Field of Classification Search .................. 709/203, 709/218, 223, 224, 225, 227, 228, 232, 250; 714/55

See application file for complete search history.

(56) References Cited

U.S. PATENT DOCUMENTS

| 4,214,313 | A  | * | 7/1980  | Geren et al. ........................ 367/1 |
| 4,635,187 | A  | * | 1/1987  | Baron et al. ................... 718/100 |
| 5,699,511 | A  | * | 12/1997 | Porcaro et al. .................. 714/55 |
| 6,212,175 | B1 | * | 4/2001  | Harsch .......................... 370/338 |
| 6,598,082 | B1 | * | 7/2003  | Douglis et al. ................ 709/227 |
| 6,761,636 | B2 | * | 7/2004  | Chung et al. ..................... 463/42 |
| 6,769,023 | B1 | * | 7/2004  | Novaes et al. ................ 709/224 |
| 7,088,698 | B1 | * | 8/2006  | Harsch .......................... 370/338 |
| 7,114,006 | B2 | * | 9/2006  | Colvig et al. ................ 709/245 |
| 7,254,605 | B1 | * | 8/2007  | Strum .......................... 709/203 |
| 7,298,733 | B2 | * | 11/2007 | Sakai et al. .................... 370/352 |
| 7,403,995 | B2 | * | 7/2008  | Mace et al. ................... 709/227 |
| 7,426,569 | B2 | * | 9/2008  | Dunk ............................ 709/232 |
| 7,634,558 | B1 | * | 12/2009 | Mangal et al. ................ 709/224 |

(Continued)

OTHER PUBLICATIONS

U.S. Appl. No. 12/748,872, filed Mar. 29, 2010.

*Primary Examiner* — Oanh Duong
(74) *Attorney, Agent, or Firm* — Perry + Currier Inc.; Kristjan Spence

(57) ABSTRACT

An electronic device and wireless base station for maintaining a persistent connection are provided. In an embodiment, a system includes an electronic device that connects to a web-server via a physical link that is bandwidth-constrained. The physical link also includes a wireless base station and at least one network address translation ("NAT") router that is configured to terminate idle connections between the client and the web-server. One of the electronic device and the wireless base station is configured to send keep-alive packets to the web-server in order to reduce the likelihood of the NAT router terminating the connection. The keep-alive packets are sent on a variable basis that is intended to reduce bandwidth consumption while ensuring that the NAT router does not deem the connection idle and terminate the connection.

20 Claims, 5 Drawing Sheets

U.S. PATENT DOCUMENTS

| | | | |
|---|---|---|---|
| 7,653,059 B1 * | 1/2010 | Slaughter et al. | 370/392 |
| 2002/0133596 A1 * | 9/2002 | Border et al. | 709/227 |
| 2002/0152446 A1 * | 10/2002 | Fleming | 714/815 |
| 2003/0221010 A1 * | 11/2003 | Yoneya et al. | 709/227 |
| 2003/0225889 A1 * | 12/2003 | Moutafov | 709/227 |
| 2004/0001474 A1 * | 1/2004 | Simelius et al. | 370/349 |
| 2004/0024879 A1 * | 2/2004 | Dingman et al. | 709/227 |
| 2004/0044771 A1 * | 3/2004 | Allred et al. | 709/227 |
| 2004/0143665 A1 * | 7/2004 | Mace et al. | 709/227 |
| 2004/0205189 A1 * | 10/2004 | Sata et al. | 709/225 |
| 2004/0264381 A1 * | 12/2004 | Banerjee et al. | 370/252 |

* cited by examiner

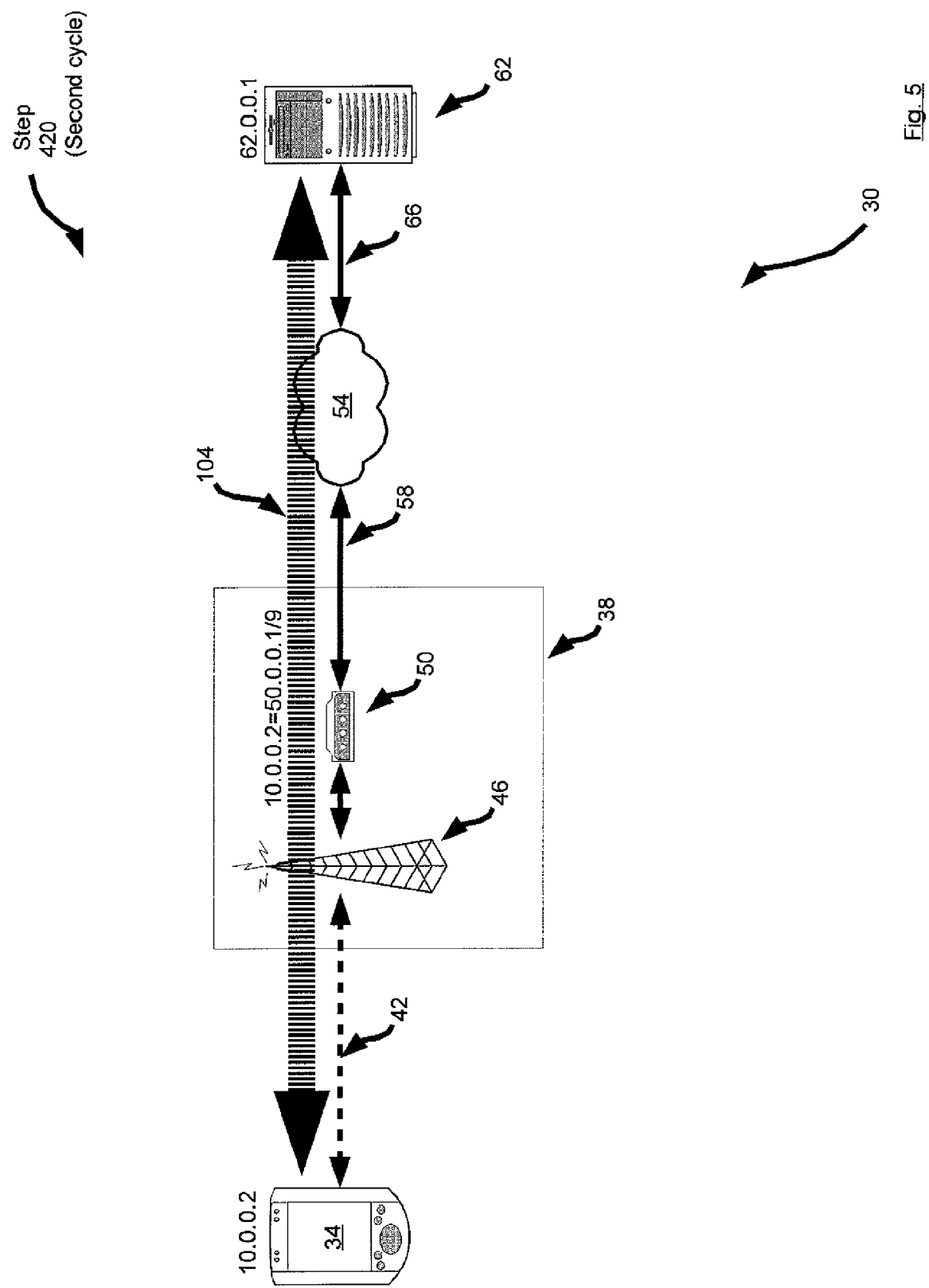

ELECTRONIC DEVICE AND BASE STATION FOR MAINTAINING A NETWORK CONNECTION

CROSS-REFERENCE TO RELATED APPLICATION

This is a continuation of U.S. patent application Ser. No. 12/748,872 filed Mar. 29, 2010, now U.S. Pat. No. 8,073,964 which is a continuation of U.S. patent application Ser. No. 12/188,570, filed Aug. 8, 2008, now U.S. Pat, No. 7,720,989 which is a divisional of U.S. patent application Ser. No. 10/784,984, filed Feb. 25, 2004, now U.S. Pat. No. 7,426,569 the contents of which are incorporated herein by reference.

FIELD OF THE INVENTION

The present application relates generally to computer networking and more particularly to an electronic device and base station for maintaining a network connection.

BACKGROUND OF THE INVENTION

In certain network connections, such as connections made over the Hypertext Transfer Protocol ("HTTP"), it can be desired to maintain a persistent connection between the client and the web-server in order to reduce the overhead needed to reestablish the connection.

However, Network Address Translation ("NAT") gateways and other equipment that lie along the connection pathway may terminate the connection in the event that the connection goes idle beyond a predefined period of time.

In order to prevent NAT gateway from terminating the connection, it is known to periodically send "keep-alive" packets from the client to the web-server. Such keep-alive packets do not actually include any transactional information and have no effect on the state of the data between the client and the web-server, and are merely used to prevent the NAT gateway from terminating the connection. It is typical to aggressively send keep-alive packets, without any regard to the actual parameters used by the NAT gateway, and thereby implement a universal strategy to keep the connection open.

However, these prior art methods of maintaining persistent connections are ideally suited to channels where bandwidth is not constrained. Thus, in bandwidth constrained mediums, such as wireless network channels, this strategy is wasteful of precious bandwidth. This prior art method is also undesirable in battery operated devices, where aggressive delivery of keep-alive packets could quickly drain the battery.

SUMMARY OF THE INVENTION

It is an object to provide a novel electronic device and base station for maintaining a network connection that obviates or mitigates at least one of the above-identified disadvantages of the prior art.

An aspect of the invention provides a system comprising a first electronic device including a first network interface for participating in a network connection. The system also includes a physical link connected to the first network interface. The physical link is for carrying the network connection. The link includes equipment for terminating the connection if the connection remains idle according to a predefined time-out criteria.

The system also includes a second electronic device that includes a second network interface for participating in the network connection via the link. The second electronic device is operable to determine the predefined time-out criteria, and send keep-alive signals to the first electronic device within the parameters of the time-out criteria.

The type of time-out criteria that is determined by the second electronic device is not particularly limited. For example, commonly the time-out criteria is simply a time period of inactivity over the physical link. Another, less common time-out criteria can be in a specially configured Network Address Translation device located on the physical link that is configured to only time-out the connection if the NAT device requires the resources. Another time-out criteria that is somewhat more common is where there is a non-idle timeout. In this system the NAT device can choose to terminate any connection that is active for more than a predefined period. The second electronic device can be configured to determine which of these criteria (or any other criteria) is being employed along the physical link and respond with a delivery of keep-alive signals so as to reduce the likelihood of the connection being terminated.

An aspect of the invention provides an electronic device comprising a microcomputer and a network interface for establishing a network connection with a second electronic device over a physical link. The physical link includes equipment with a timeout period that terminates the connection when the connection is idle. The microcomputer is operable to send keep-alive signals to the second electronic device according to an iteratively changing criteria to establish the timeout period. Thereafter, the microcomputer sends the keep-alive signals within the timeout period and thereby reduces the likelihood of the equipment dropping the connection due to idleness.

An aspect of the invention provides base station comprising apparatus for establishing a network connection with a second electronic device over a physical link. The physical link includes equipment with a timeout period that terminates the connection when the connection is idle. The apparatus is operable to send keep-alive signals to the second electronic device according to an iteratively changing criteria to establish the timeout period. Thereafter, the apparatus sends the keep-alive signals within the timeout period and thereby reduces the likelihood of the equipment dropping the connection due to idleness.

BRIEF DESCRIPTION OF THE DRAWINGS

The invention will now be described by way of example only, and with reference to the accompanying drawings, in which.

DETAILED DESCRIPTION OF THE INVENTION

Figure 1:
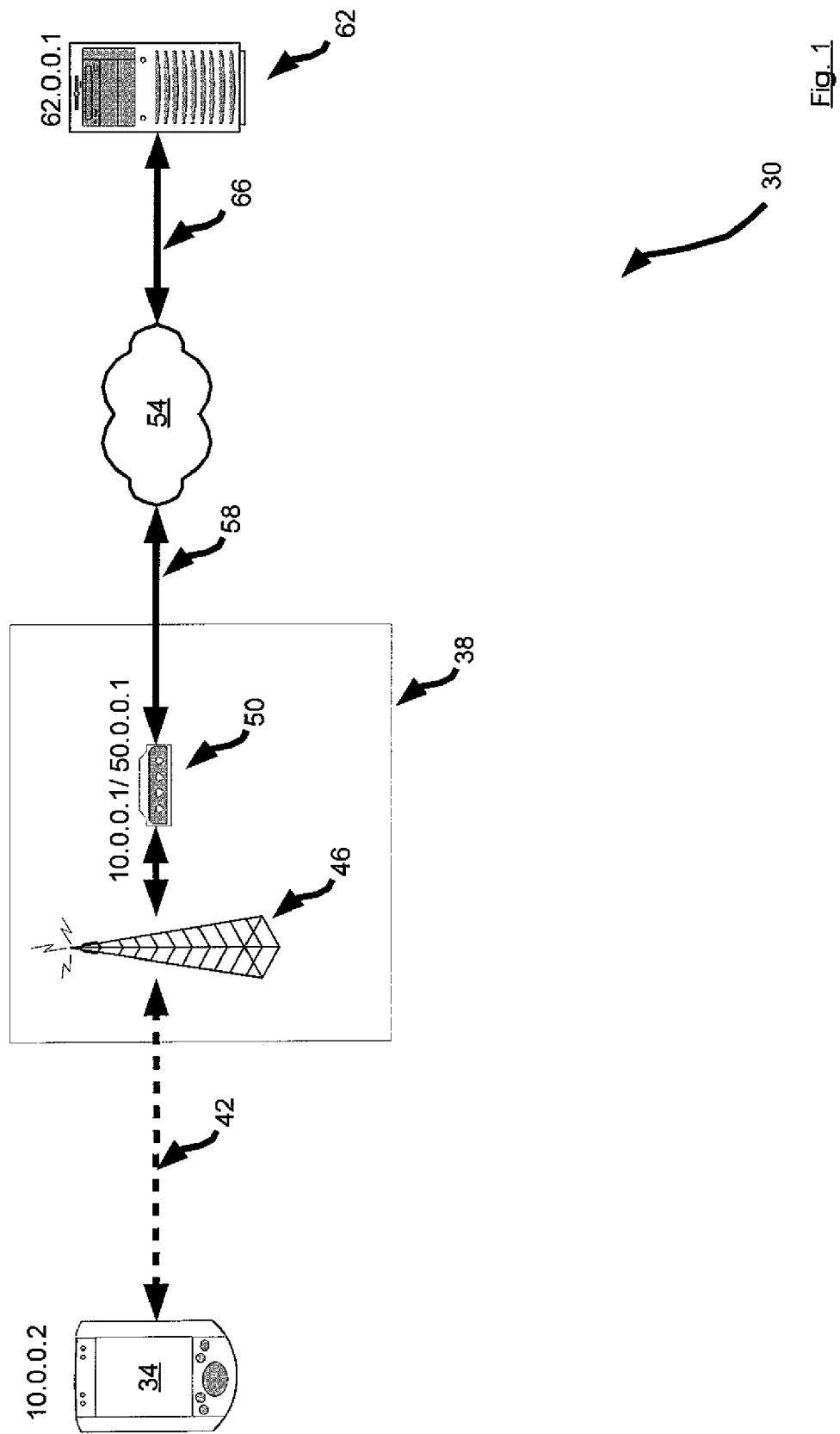
FIG. 1 is a schematic representation of a system for maintaining a network connection in accordance with an embodiment of the invention.

Referring now to FIG. 1, a system for maintaining a persistent network connection is indicated generally at 30. In a present embodiment, system 30 includes at least one client 34 that connects to a service provider node 38 via a wireless link 42. Node 38 includes a wireless base station 46 that interacts with client 34. via link 42 and a NAT gateway 50. In turn, gateway 50 connects to the Internet 54 via a backhaul 58. Backhaul 58 can be a T1, T3 or any other suitable link for connecting node 38 to Internet 54. Internet 54, itself, connects to a web-server 62 via a second backhaul 66.

In a present embodiment, client 34 is a battery operated device that is based on the computing environment and functionality of a wireless personal digital assistant. It is, however, to be understood that client 34 need not be battery operated and/or can include the construction and functionality of other electronic devices, such as cell phones, smart telephones, desktop computers or laptops with wireless 802.11 or bluetooth capabilities or the like.

It is also to be understood that, at least a portion of the connection between client 34 and web-server 62 is bandwidth-constrained. In system 30, since link 42 is a wireless connection that may need to serve a plurality of clients 34, then link 42 is bandwidth constrained in relation to backhaul 58, backhaul 66 and the other elements that compose the connection between client 34 and web-server 62. Such bandwidth constraints can thus interfere with the speed with which a user operating clients 34 can access Internet 54 and web-server 62. Such constraints become particularly acute when a plurality of clients wish to access link 42. Furthermore, judicious use of link 42 by client 34 is desirable due to the fact that client 34 is battery operated.

NAT gateway 50 is based on standard NAT technology and thus allows a multiple number of clients 34 connected to node 38 to connect to Internet 54 though a public Internet Protocol ("IP") address assigned to NAT gateway 50. Accordingly, client 34 (and other clients connected to node 38) will typically have a private IP address, while NAT gateway 50 will have a public IP address accessible to any party on Internet 54. Thus, as client 34 accesses Internet 54, web-server 62 will communicate with client 34 via gateway 50, with gateway 50 "translating" IP addresses during such communication. In an example unique to the present embodiment, client 34 has the private IP address "10.0.0.2", gateway 50 has the private IP address 10.0.0.1 and the public IP address of "50.0.0.1" and web-server has the public IP address "62.0.0.1".

Like existing NAT gateways, gateway 50 is thus also configured to automatically terminate idle connections between client 34 and Internet 54 in order to free-up resources for NAT gateway 50. Client 34 is configured to maintain a connection between client 34 and web-server 62 notwithstanding the automatic termination feature of gateway 50. More particularly, client 34 is configured to send keep-alive packets during an idle communication period to web-server 62 according to a variable criteria, such keep-alive packets being intended to prevent gateway 50 from dropping the connection between client 34 and web-server 62, but without changing the state of data in client 34 or web-server 62. Such keep-alive packets can be any suitable packet that achieves this result, such as a "no-op" command, a command that generates a non critical error result in the server or a command designed into the application level protocol as a keep alive mechanism. In a present embodiment, the variable criteria is based on a time period that is arrived upon iteratively. The iterations are considered complete when a time period is established that is substantially close to the maximum amount of time that NAT gateway 50 will allow to lapse before terminating the connection between client 34 and web-server 62. Further understanding about client 34 and this criteria will be provided below.

Figure 2:
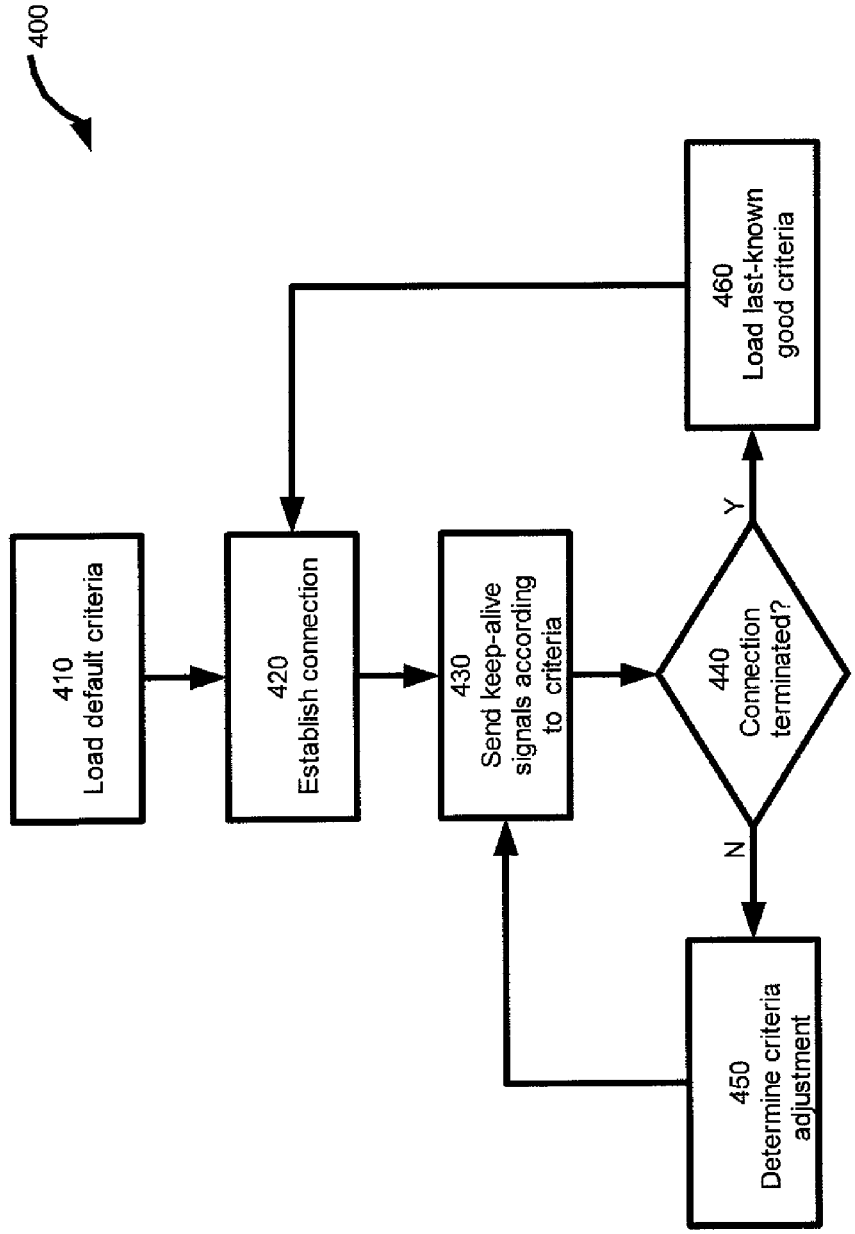
FIG. 2 is a flow chart depicting a method of maintaining a network connection in accordance with another embodiment of the invention.

In order to help explain certain of these implementations and various other aspects of system 30, reference will now be made to FIG. 2 which shows a method for maintaining a network connection and which is indicated generally at 400. In order to assist in the explanation of the method, it will be assumed that method 400 is operated by client 34 using system 30. However, it is to be understood that client 34, system 30 and/or method 400 can be varied, and need not work exactly as discussed herein in conjunction with each other, and that such variations are within the scope of the invention.

Before discussing method 400, it will be assumed that NAT gateway 50 is configured to drop connections where a connection is idle for greater than fifteen minutes (However, other time periods are also within the scope of the invention, according to the configuration of the particular NAT gateway. Such other time periods can be greater than twenty minutes, or greater than thirty minutes, or greater than ten minutes.). It will also be assumed that this timeout period is unknown to client 34 on invocation of method 400.

Beginning first at step 410, a set of default criteria is loaded. As will be discussed below, the default criteria that is loaded is used by client 34 to define an initial time period during which keep-alive packets are sent by client 34 in order to prevent gateway 50 from dropping a connection between client 34 and an entity on Internet 54, but without changing the state of data in client 34 or that entity. In the present example, it will be assumed that the default criteria that is loaded will be a period of five minutes. (Other example default periods can be seven minutes, ten minutes and twelve minutes.)

Figure 3:
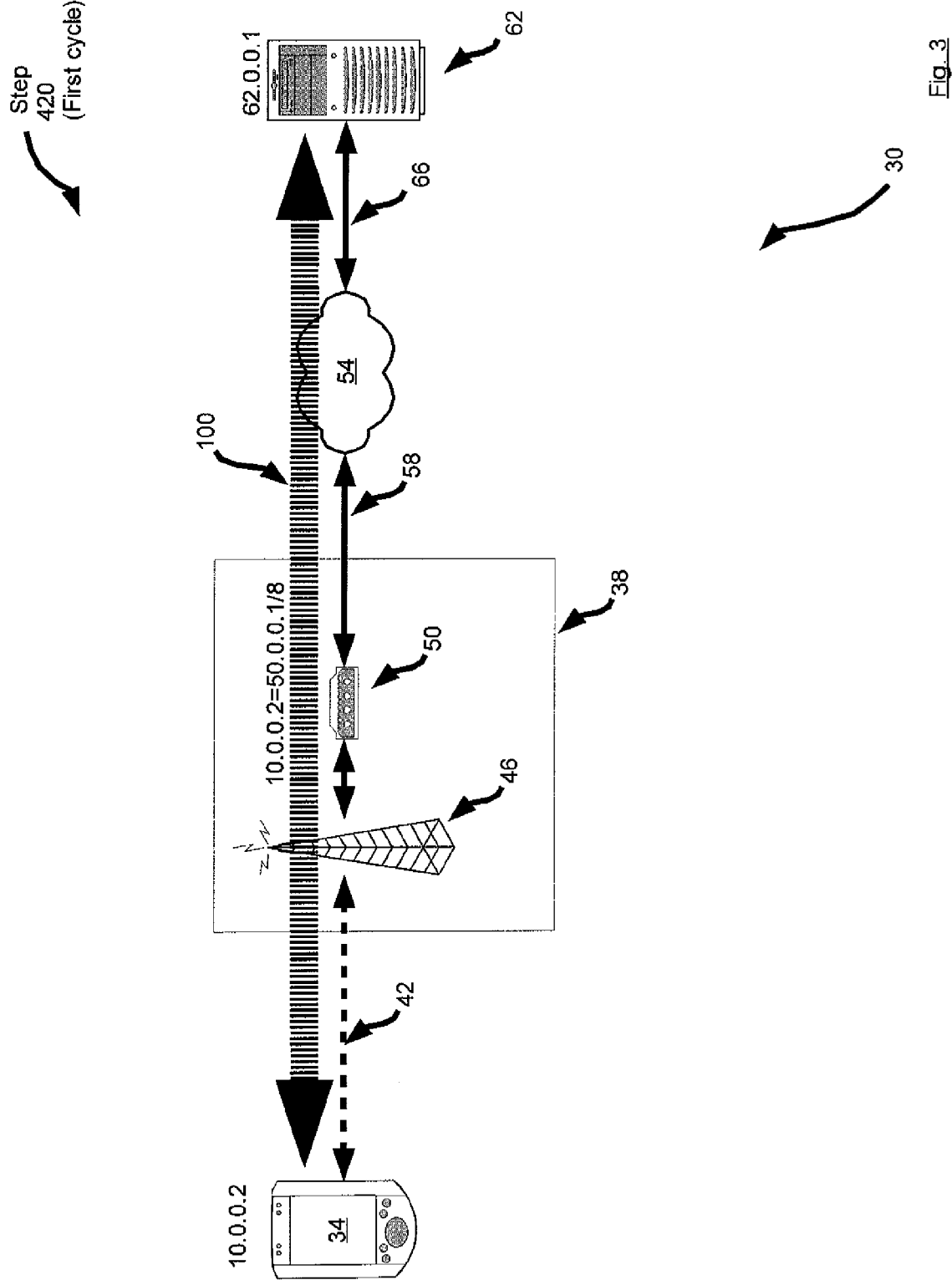
FIG. 3 shows the system of FIG. 1 during the performance of the method in FIG. 2.

Next, at step 420, a connection is established. Continuing with the present example, it will be assumed that client 34 opens a connection with web-server 62. This example is represented in FIG. 3, wherein a connection is represented by a dotted line indicated generally at 100. The connection is opened in the usual manner, such as by having a web-browser on client 34 open an HTTP web-page that is located on web-server 62. The establishment of connection 100 thus involves having NAT gateway 50 create a mapping of client 34's private IP address to gateway 50's own public IP address. This is represented in FIG. 3 by having gateway 50 represent to web-server 62 that the public IP address of client 34 is "50.0.0.1/8", wherein "50.0.0.1" is gateway 50's own public IP address, while "/8" represents the individual port on gateway 50 that is mapped to client 34's private IP address of "10.0.0.2". Thus, traffic carried over connection 100 will be passed through gateway 50 using this mapping. Once connection 100 is opened, network traffic is sent thereover in the usual manner. In general, it is to be reemphasized that this is merely an example and the way in which a connection is established is not particularly limited.

Next, at step 430, keep-alive signals are sent according to the established criteria. Since the criteria that was established at step 410 is a period of five minutes, then at step 430 keep-alive signals will be sent from client 34 to web-server 62 every five minutes. Since these keep-alive signals pass through gateway 50, then gateway 50 will only perceive that connection 100 is idle for five minute periods. Since this five minute period is less than the fifteen minute timeout period that gateway 50 will await before terminating connection 100, then gateway 50 will not terminate connection 100 and thus connection 100 will be persistent.

Method 400 will then advance to step 440, at which point a determination is made as to whether the connection established at step 420 has been terminated. Since the five minute interval during which client 34 sends keep-alive signals to web-server 62 is less than the previously mentioned fifteen minute timeout period, connection 100 will not be terminated and so it will be determined at step 440 that "no", connection 100 has not been terminated and method 400 will advance to step 450.

Figure 4:
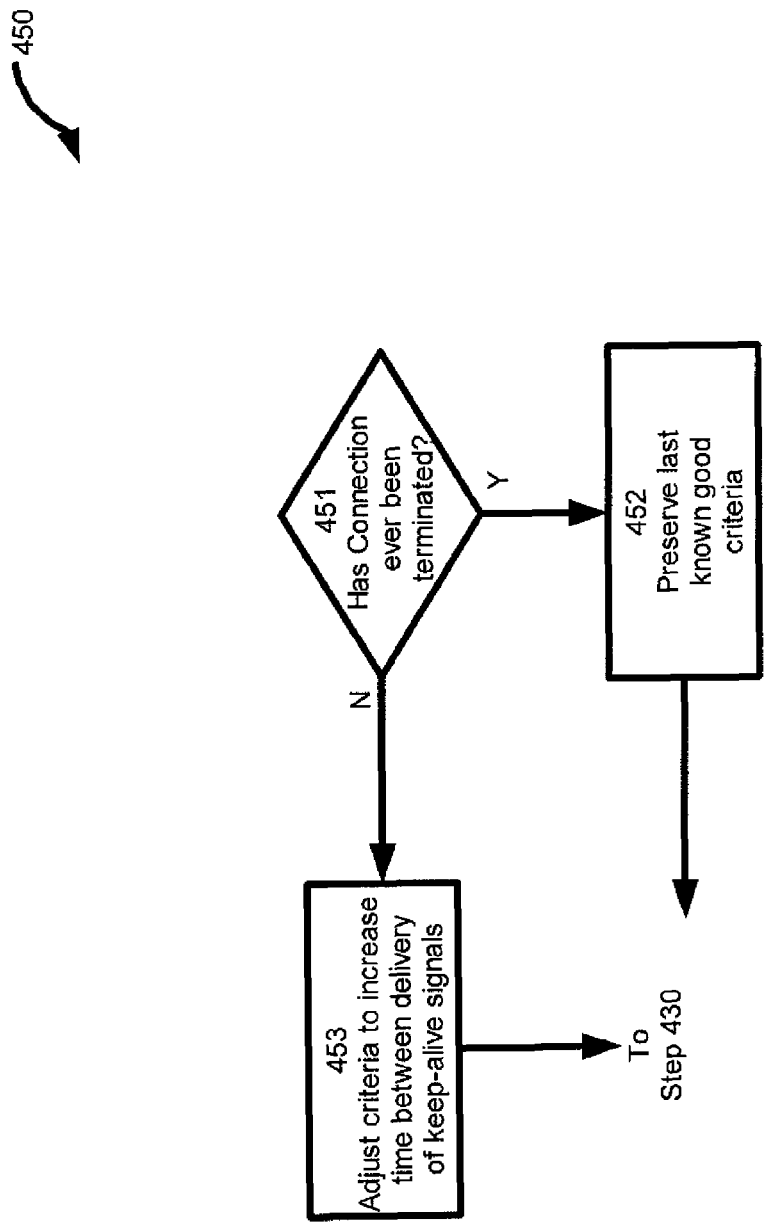
FIG. 4 shows set of sub-steps for performing one of the steps in the method of FIG. 2; and, FIG. 5 shows the system of FIG. 1 during the performance of the method in FIG. 2.

At step 450, an adjustment, if any, to the criteria used at step 430 will be determined. In a present embodiment, step 450 is carried out over a number of sub-steps, indicated generally at 450 on FIG. 4. At step 451, it is determined whether the connection has ever been terminated. If there has been a prior termination, then the method advances to step 452 and the last known good criteria is maintained, and thus no adjustment is made to the criteria. At this point the method returns to step 430 on FIG. 2.

However, if at step 451 it is determined that there has been no prior termination of the connection, then the method advances to step 453 and an adjustment is made to increase the time between delivery of the keep-alive signals. Thus, in the example being discussed herein in relation to connection 100, it will be determined at step 451 that the connection has never been terminated, and the method will advance from step 451 to step 453. At step 453, the criteria will be adjusted to increase the amount of time between delivery of keep-alive signals. The amount and/or rate by which the increase is made at step 453 is not particularly limited. In accordance with the present example, it will be assumed that the time interval will be increased by one-minute each time method 400 advances to step 453. Accordingly, during this cycle through method 400, the time period will be increased to six minutes from five minutes.

The method then advances from step 453 back to step 430, at which point the keep-alive signals are sent according to the criteria that has been established at step 453. Since the criteria that was established at step 453 is a period of six minutes, then at step 430 keep-alive signals will be sent from client 34 to web-server 62 every six minutes. Since these keep-alive signals pass through gateway 50, then gateway 50 will only perceive that connection 100 is idle for six minute periods. Since this six minute period is less than the fifteen minute timeout period that gateway 50 will await before terminating connection 100, then gateway 50 will not terminate connection 100 and thus connection 100 will be persistent.

Method 400 will thus continue to cycle through steps 430, 440 and 450 (i.e. sub-steps 451 and 453) as previously mentioned until the criteria established at step 453 finally adjusts the time interval beyond the timeout period of gateway 50. More specifically, once at step 453 a time period of sixteen minutes is established, then during the next cycle through step 430 the keep-alive signal will be sent outside the fifteen minute time-out period, and thus connection 100 will be terminated.

This time, when method 400 reaches step 440, it will be determined that connection 100 has been terminated, and thus method 400 will advances from step 440 to step 460, at which point the last-known good criteria will be loaded. In the present example, the last-known good criteria that was established previously at step 453 will be the time interval of fifteen minutes, and thus at step 460, in this example, client 34 will load the time period of fifteen minutes as the criteria.

Method 400 then advances from step 460 to step 420 at which point the connection is established (i.e. re-established). Continuing with the present example, it will be assumed that client 34 reopens a connection with web-server 62. This example is represented in FIG. 5, wherein a new connection is represented by a dotted line indicated generally at 104. The connection is opened in the usual manner, such as by having a web-browser on client 34 open an HTTP web-page that is located on web-server 62. The establishment of connection 104 thus involves having NAT gateway 50 create a mapping of client 34's private IP address to gateway 50's own public IP address. This is represented in FIG. 5 by having gateway 50 represent to web-server 62 that the public IP address of client 34 is "50.0.0.1/9", wherein "50.0.0.1" is gateway 50's own public IP address, while "/9" represents the individual port on gateway 50 that is mapped to client 34's private IP address of "10.0.0.2". Thus, traffic carried over connection 104 will be passed through gateway 50 using this mapping. Once connection 104 is opened, network traffic is sent thereover in the usual manner.

Method 400 then advances to step 430, at which point the keep-alive signals are sent according to the criteria that has been established at step 460. Since the criteria that was established at step 460 is a period of fifteen minutes, then at step 430 keep-alive signals will be sent from client 34 to web-server 62 every fifteen minutes. Since these keep-alive signals pass through gateway 50, then gateway 50 will only perceive that connection 104 is idle for fifteen minute periods. Since this fifteen minute period is acceptable according to the fifteen minute timeout period that gateway 50 will await before terminating connection 104, then gateway 50 will not terminate connection 104 and thus connection 104 will be persistent.

Method 400 will then advance from step 430 to step 440, at which point a determination is made as to whether the connection established at step 420 has been terminated. Since the fifteen minute interval during which client 34 sends keep-alive signals to web-server 62 is acceptable in relation to the fifteen minute timeout period, connection 104 will not be terminated and so it will be determined at step 440 that "no", connection 104 has not been terminated and method 400 will advance to step 450.

At step 450, an adjustment, if any, to the criteria used at step 430 will be determined. Recall that in a present embodiment step 450 is carried out over a number of sub-steps, indicated generally at 450 on FIG. 4. At step 451, it is determined whether the connection has ever been terminated. Since the connection between client 34 and web-server 62 has been terminated once already (i.e. since connection 100 was terminated), then the method advances to step 452 and the last known good criteria is maintained, and thus no adjustment is made to the criteria. More specifically, since it is known that the fifteen minute time interval is an acceptable criteria, this criteria is maintained and at this point the method returns to step 430 on FIG. 2.

Back at step 430, at which point the keep-alive signals are thus sent according to the criteria preserved at step 452. Since the criteria that was established at step 452 is a period of fifteen minutes, then at step 430 keep-alive signals will be sent from client 34 to web-server 62 every fifteen minutes. Since these keep-alive signals pass through gateway 50, then gateway 50 will only perceive that connection 104 is idle for fifteen minute periods, within the accepted fifteen minute timeout period that gateway 50 will await before terminating connection 104. Thus gateway 50 will not terminate connection 104 and thus connection 104 will be persistent. Method 400 will thus continue to cycle as long as needed to maintain a connection between client 34 and web-server 62 during idle period.

It should now be apparent that a change in routing of connection 104 (or other change in the physical link between client 34 and web-server 62) could cause the timeout period to change—i.e. decrease over time from the time period that had been previously established through earlier cycles through method 400. For example, if another router in Internet 54 is introduced into the pathway that carries connection 104, and where that router drops idle connections after ten minutes, then method 400 may at various times cycle through step 460 and thereby the connection between client 34 and web-server 62 may be torn down and reestablished several times until at step 460 the criteria is decreased back to a ten minute interval. It is thus contemplated that step 460 can include sub-steps that will continue to decrease the criteria to shorter and shorter time periods until the shortest timeout period for any equipment along the physical link between client 34 and web-server 62 is established, at which point that shortest timeout period will be used at step 430. In this manner, it is contemplated that the criteria used at step 430 may at various times decrease or increase according to the timeout behaviours of the equipment that forms the physical link between client 34 and web-server 62.

Also, it is to be understood that, in other embodiments of the invention, normal spurious connection timeouts can be handled by a suitably modified version of method 400. Such a modified version of method 400 can be configured to respond to such spurious connection timeouts. For example, a form of weighting or hysteresis can be utilized in a suitably modified version of method 400 that favours time-intervals for delivering keep-alive signals that client 34 has previously found effective in reducing the likelihood of connection 104 being terminated.

It should also be understood that the rates by which the criteria is adjusted at step 450 and step 460 is not particularly limited. Further, the type of criteria that is used need not be particularly limited. For example the changes in criteria at step 450 and 460 need not be in a linear fashion, and need not be based on simple minute-by-minute increments or decrements. For example, a logarithmic convergence, based on splitting the various time intervals in half, using Newton's Method can be used. As an additional example, it can be desired at step 450 and step 460 to consider the remaining battery life of client 34, and thus where the battery of client 34 has a long period of remaining life, the criteria adjustment made at step 450 need not be as aggressive. However, where the battery of client 34 has a short period of remaining life, the criteria adjustment made at step 450 may aggressively attempt to have the criteria reach the idle timeout period as fast as possible in order to preserve the battery life of client 34.

While only specific combinations of the various features and components of the invention have been discussed herein, it will be apparent to those of skill in the art that desired subsets of the disclosed features and components and/or alternative combinations of these features and components can be utilized, as desired. For example, while not necessary, it is typically contemplated that steps 430-460 are only invoked during time periods that client 34 is aware that connection 100 (or connection 104) is idle, and so method 400 can be modified to cause steps 430-460 to be performed only during those time periods when connection 100 (or connection 104) is idle.

Furthermore, it is also to be understood that the origin of the keep-alive packets need not be restricted to client 34. For example, where base station 46 is aware of the need to maintain connection 100 as persistent, then it can be desired to have base station 46 perform steps 430-460 on behalf of client 34 and thereby free up resources on client 34 and link 42. By the same token, it is contemplated that steps 430-460 could also be conducted by web-server 62 on behalf of client 34.

In another variation of the invention, it is contemplated that steps 430-460 can be performed by client 34 prior to the establishment of a connection, and thereby determine the appropriate criteria for sending keep-alive signals within the timeout period prior to establishment of the connection and thereby reduce likelihood of termination of the connection.

Further, once this timeout period is established, it is contemplated that the period can be reported to other clients attached to node 38, thereby obviating the need for those clients to perform steps 430-460 themselves.

While system 30 is directed to a specific type of network, it should be understood that other types of clients, servers, and networks can be used. For example, the invention can be applied to peer-to-peer connections and need not be limited to client/server type relationships. Furthermore the type of physical connections that carry the connection are not limited, and can be based on Ethernet, Intranets, 802.11, bluetooth etc. Additionally, while the embodiments herein are discussed in relation to connections over which at least a portion are bandwidth constrained, it should be understood that the invention is also applicable to connections that are not bandwidth constrained.

The above-described embodiments of the invention are intended to be examples and alterations and modifications may be effected thereto, by those of skill in the art, without departing from the scope of the invention which is defined solely by the claims appended hereto.

The invention claimed is:

1. A base station for maintaining a persistent connection between a first electronic device and a second electronic device via a network connection carried over a physical link between the base station and an equipment for terminating said network connection if said network connection remains inactive according to a predefined termination criterion of said equipment, the base station comprising:

a processor configured to send signals on said connection for preventing termination of said connection;

said processor configured to send said signals according to a plurality of different time intervals and to determine when one of said time intervals results in said equipment terminating said connection, thereby determining that said one of said time intervals corresponds to said predefined termination criterion of said equipment; and, said processor further configured to continue sending said signals following determination of said predefined termination criterion.

2. The base station of claim 1 wherein said processor is further configured to send said signals only when said connection is inactive.

3. The base station according to claim 2 wherein said signals are no-op signals.

4. The base station of claim 1 wherein said equipment is a NAT router.

5. The base station of claim 1 wherein said criterion is a predefined time period.

6. The base station of claim 5 wherein said processor is further configured to determine said predefined time period by:

establishing said connection with a time period equal to an initial default time period;

sending one of said signals to said second electronic device once during said time period;

increasing said time period if said time period does not cause said connection to be dropped, then repeating said sending step; and maintaining a last-known good time period if said time period does cause said connection to be dropped;

re-establishing said connection; and thereafter, sending said signals to said second electronic device based on said last-known good time period.

7. The base station according to claim 6 wherein said first electronic device is a client, said second electronic device is a web-server and at least a portion of said physical link includes the Internet.

8. The electronic device according to claim 7 wherein said client is a wireless device and at least a portion of said physical link includes a wireless connection from said wireless device to the Internet.

9. A method of maintaining a network connection, the method comprising:
  establishing a connection from a first electronic device to a second electronic device via a physical link that includes an equipment for terminating said connection if said connection remains inactive according to a predefined termination criterion;
  sending signals for preventing termination of said connection according to a plurality of different time intervals;
  determining when one of said time intervals results in said equipment terminating said connection, thereby determining that said one of said time intervals corresponds to said predefined termination criterion of said equipment; and,
  continuing to send said signals following determination of said predefined termination criterion.

10. The method of claim 9, further comprising:
  loading a time period into said first electronic device of an initial default value.

11. The method of claim 10 wherein said determining comprises:
  increasing said time period and repeating said sending step; and,
  repeating said increasing step until said connection is terminated by said equipment;
  fixing said time period; and thereafter,
  sending said signals using said time period established at said fixing step.

12. The method according to claim 11 wherein said fixing step is performed by iteratively decreasing said time period until said connection is no longer terminated by said equipment.

13. The method according to claim 9 wherein said first electronic device is a base station, said second electronic device is a web-server and at least a portion of said link includes the Internet.

14. The method according to claim 9, further comprising sending said signals only when said connection is inactive.

15. The method according to claim 9 wherein said connection carries an HTTP web-page request by said first electronic device of said second electronic device and said signals is are no-op signals.

16. The method according to claim 9 wherein said first electronic device is a client, said second electronic device is a web-server and at least a portion of said link includes the Internet.

17. The method according to claim 16, further comprising:
  following said determining step, sending said determined predefined termination criterion to at least one other client.

18. The method according to claim 9 wherein said first electronic device is battery operated and said increasing step is based on larger intervals when said battery life is approaching depletion.

19. The method according to claim 18 wherein said first electronic device is a wireless device and at least a portion of said link includes a wireless connection from said wireless device to the Internet.

20. A non-transitory computer-readable storage medium containing a set of programming instructions; said programming instructions, when executed by a first electronic device, for performing a method comprising:
  establishing a connection from a first electronic device to a second electronic device via a physical link that includes an equipment for terminating said connection if said connection remains inactive according to a predefined termination criterion;
  sending signals for preventing termination of said connection according to a plurality of different time intervals;
  determining when one of said time intervals results in said equipment terminating said connection, thereby determining that said one of said time intervals corresponds to said predefined termination criterion of said equipment; and,
  continuing to send said signals following determination of said predefined termination criterion.

* * * * *